United States Patent [19]
Ginther

[11] 3,713,527
[45] Jan. 30, 1973

[54] ELEVATOR-FEEDER STRUCTURE

[75] Inventor: Gary D. Ginther, Leonard, Mich.

[73] Assignee: Clyde Corporation, Troy, Mich.

[22] Filed: Sept. 16, 1971

[21] Appl. No.: 181,098

[52] U.S. Cl. ............... 198/53, 198/33 AA, 198/154, 221/11, 221/162
[51] Int. Cl. ..................... B65g 47/14, B65g 47/24
[58] Field of Search ... 198/33 AA, 55, 158, 207, 154, 198/197, 199, 198, 53; 221/11

[56] References Cited

UNITED STATES PATENTS

| 137,224 | 3/1873 | Mansfield | 198/198 |
|---|---|---|---|
| 3,282,395 | 11/1966 | Crotty | 198/33 AA |
| 3,463,171 | 8/1969 | Dolman | 198/197 |

Primary Examiner—Evon C. Blunk
Assistant Examiner—James Miller
Attorney—Barnes, Kisselle, Raisch & Choate

[57] ABSTRACT

Endless elevator band has horizontal and sloped article elevating flights which respectively discharge articles frontally and laterally for distributing them over the width of a receiving chute. The chute is divided into a plurality of converging wall channels, each funneling articles into a feed track.

The sloped flights are secured only at their central portions to the band, the ends of the flights being free of attachment thereto to facilitate flexing of the band. Side rails contain articles on the sloped flights and the rails are tapered outwardly to prevent wedge-locking of articles thereagainst.

The supply hopper for the elevator has a sloped bottom and a vertical baffle spaced from the band. The bottom edge of the baffle is spaced from the hopper bottom to define a restricted opening for limiting the mass of articles bearing against the band.

A return chute returns to the hopper articles which fail to lodge in the feed tracks.

A cover plate is spaced from the band below the hopper bottom. To relieve jamming of articles received in the space the plate is sloped outwardly in an upward direction and is yieldably spring biased to closed condition.

55 Claims, 14 Drawing Figures

INVENTOR.
GARY D. GINTHER

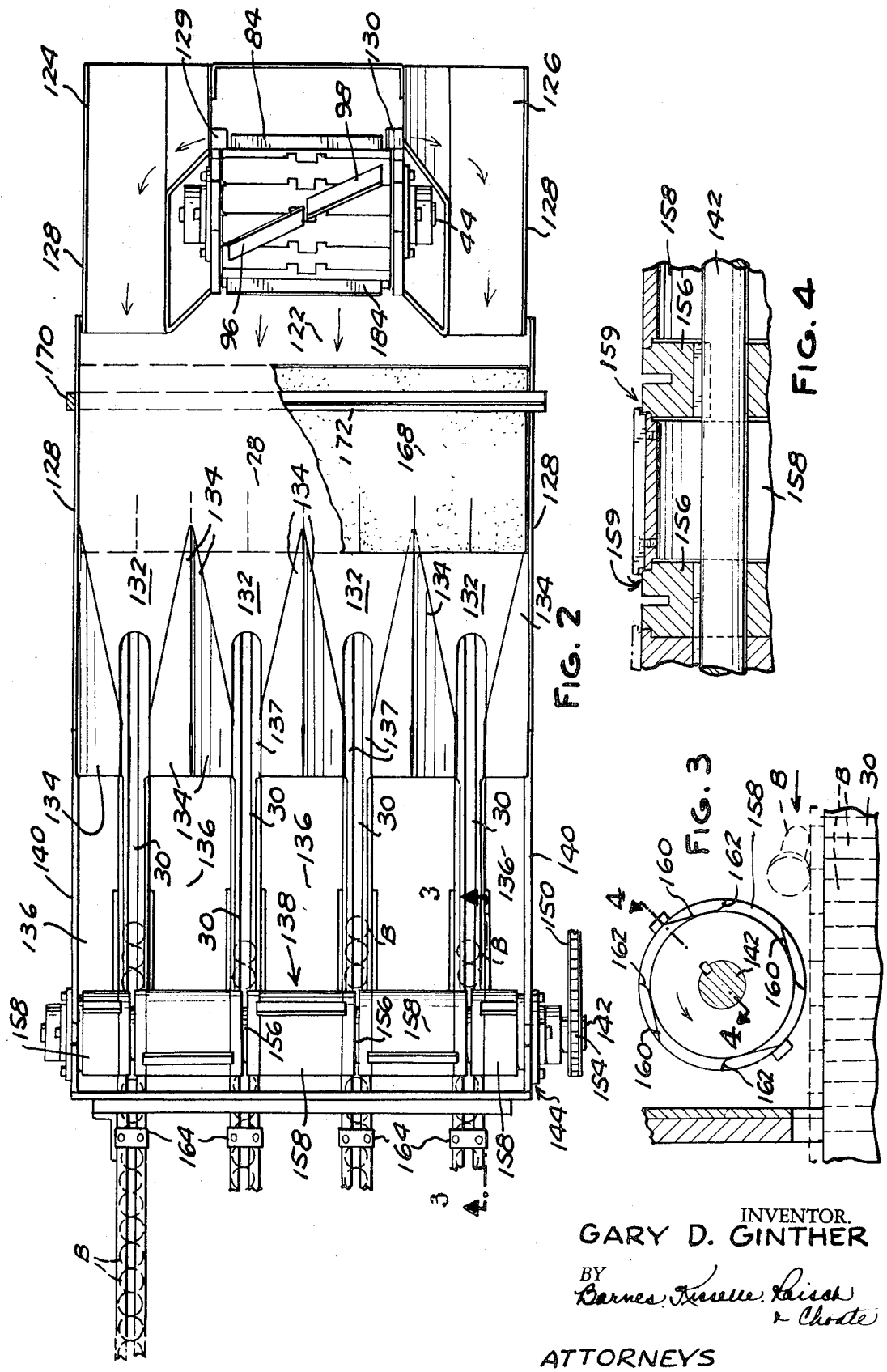

INVENTOR
GARY D. GINTHER

BY
Barnes, Kisselle, Raisch
& Choate

ATTORNEYS

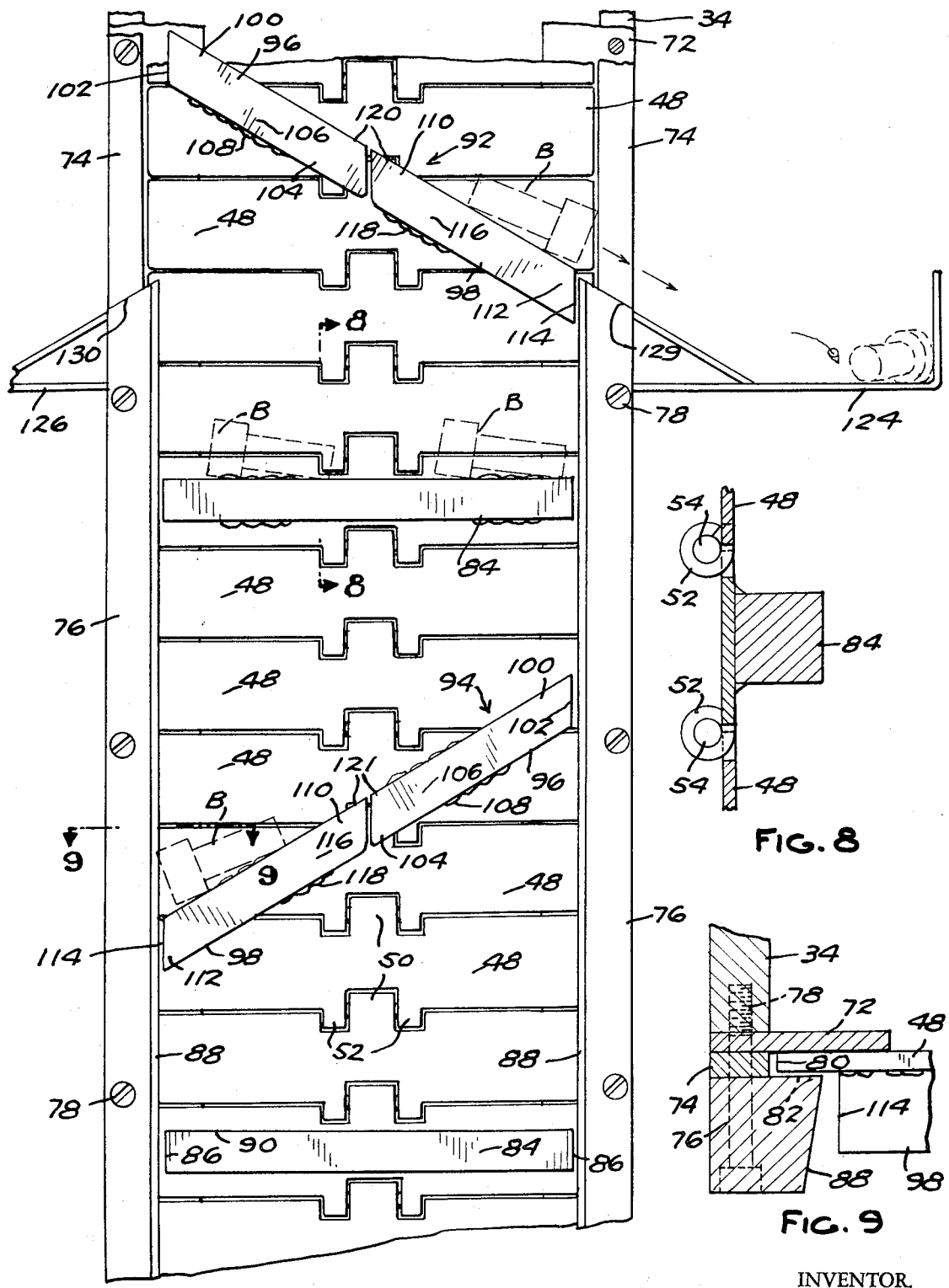

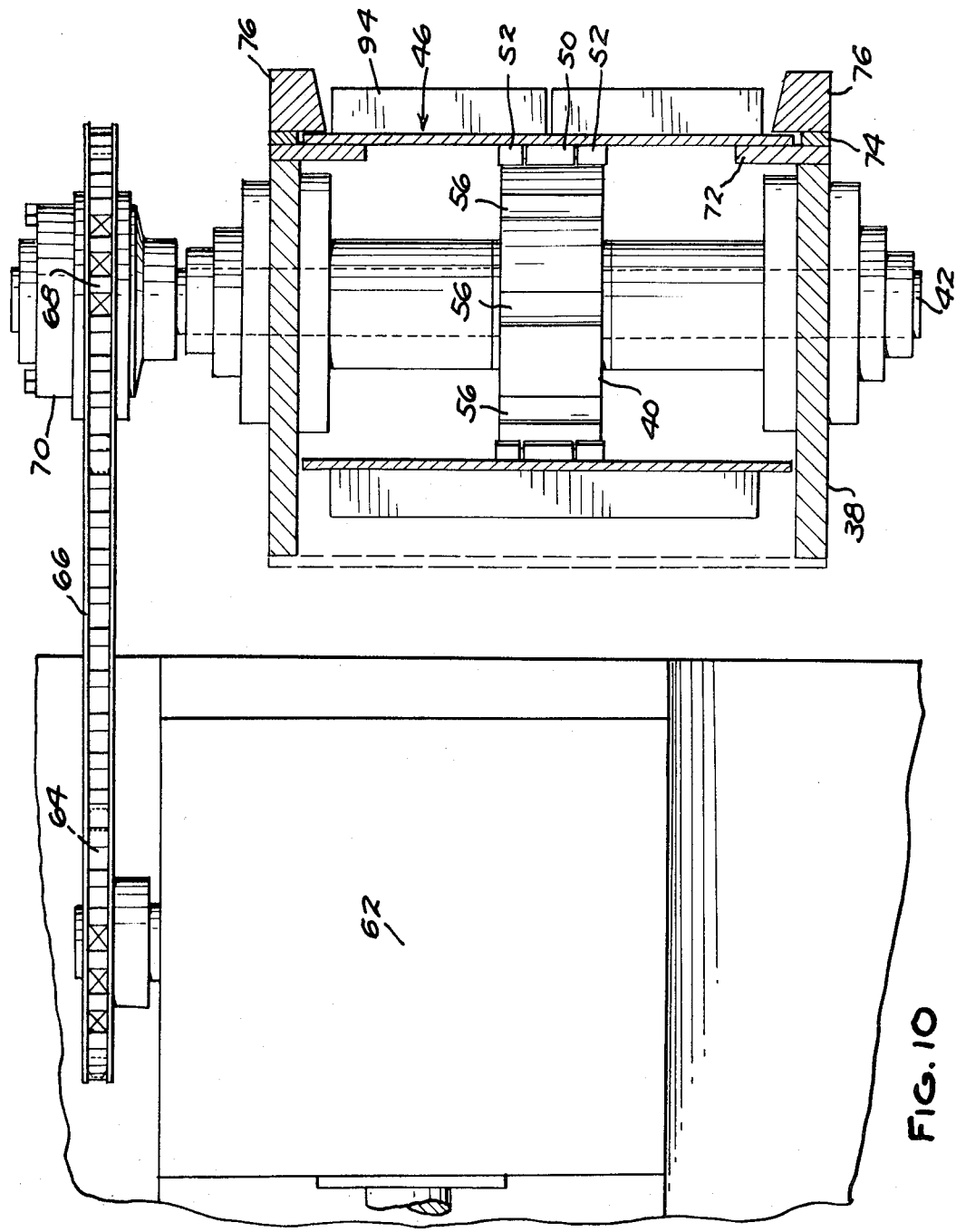

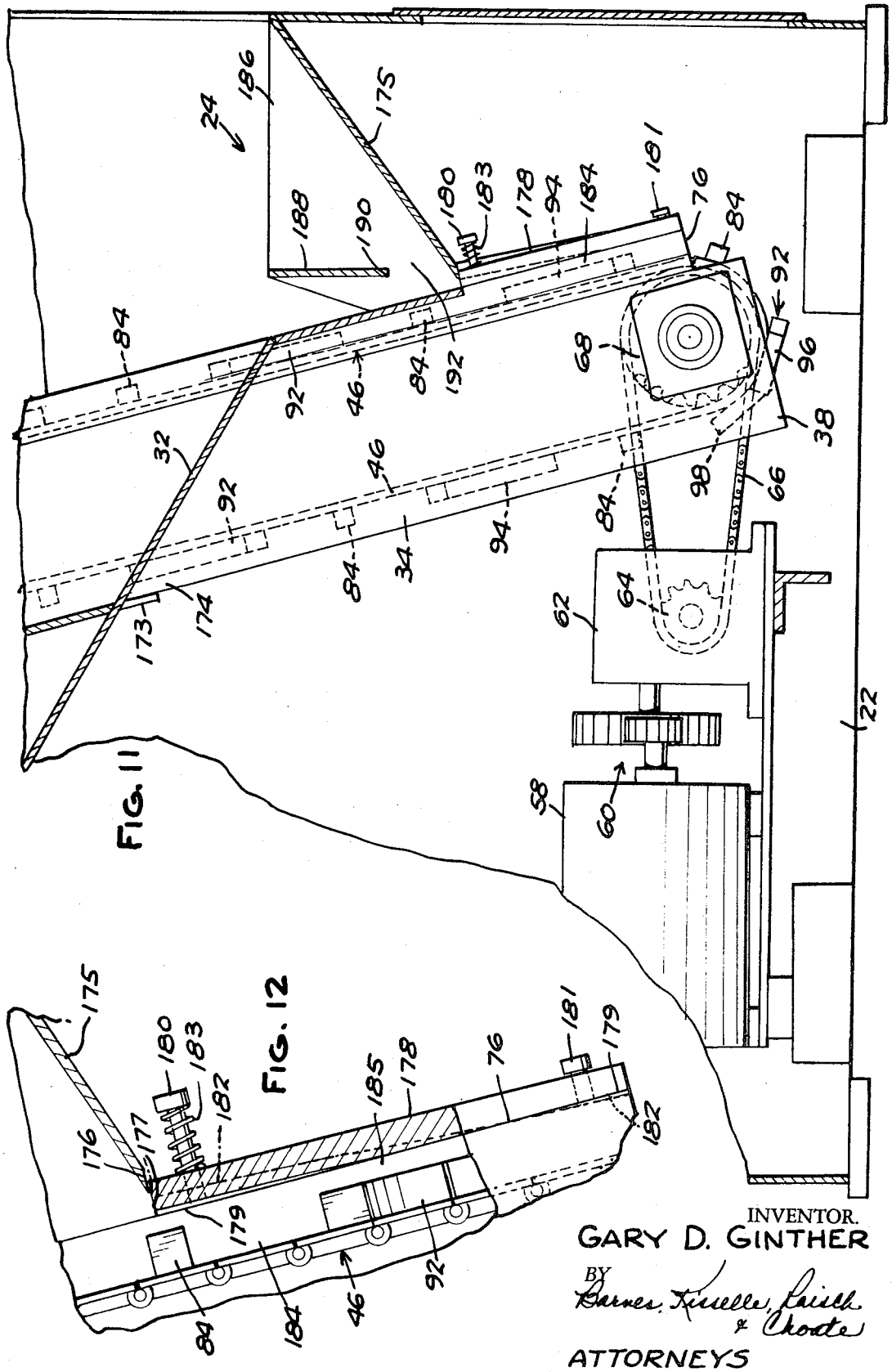

ELEVATOR-FEEDER STRUCTURE

This invention relates to an elevator and feeder which elevates articles such as bolts and nuts from a supply within a hopper and ultimately distributes the elevated articles into a number of individual tracks from which the articles are fed to other equipment. Since the hopper is frequently at floor level, this type of elevator-feeder is sometimes called a floor feeder in the industry.

In the conventional feeder of this type, the elevated articles are discharged directly into a track which receives and holds the articles in a predetermined orientation. This track serves as a magazine from which the parts are distributed into the individual feed tracks.

It is very difficult to provide a sufficient volume of flow of articles through the magazine track which inherently is a bottle neck. It is also very difficult to attain reliable distribution from the magazine track into the individual feed tracks. The latter difficulty stems from the fact that distribution to the feed tracks in conventional apparatus must be accomplished by mechanical gating, reciprocating shuttles and the like. This problem is compounded by the fact that articles such as nuts, bolts, and the like typically carry scale from heat treating and/or dirt-laden protective oil which quickly fouls the distributing mechanism.

Insofar as I am aware, prior to the present invention no feeder of this type has existed which would feed articles in the volume and with the reliability required for use in connection with high speed automated production equipment such as is used, for example, in the automotive manufacturing industry.

The object of the present invention is to provide a relatively simple inexpensive feeder of this type which is improved to feed articles in such volume and with such reliability.

Generally the invention contemplates an elevator structure which elevates articles from a hopper and discharges them both frontally and laterally for distributing them over the width of a broad receiving chute. A downstream portion of the chute has a number of channels distributed across its width and the channels have sloped, converging side walls which funnel the articles toward single file, an individual feed track being mounted to receive articles from each channel and hold them in a predetermined orientation in single file preparatory to feeding the articles to other equipment.

To achieve plural direction discharge of articles onto the distributing chute, horizontal elevator flights are provided which discharge frontally of the elevator and sloped flights are provided which discharge laterally of the elevator. The elevator may comprise an endless, flexible, circuital band and in such case the sloped flights are attached only at their central portions to the elevator, the ends of the sloped flights being free from attachment to facilitate flexing of the elevator during its movement.

Side rails contain the articles on the sloped flights and the rails are tapered outwardly to prevent articles being elevated from becoming wedge-locked against the rails.

A hopper adjacent the bottom of the elevator is provided with baffling to limit the mass of articles which can bear against the elevator. A return chute returns to the hopper articles which fail to become properly lodged on the individual feed tracks, such articles falling off of the tracks onto the return chute.

A cover plate cooperates with that portion of the elevator below the hopper bottom to define a pick-up space for articles to be elevated. To prevent articles from becoming jammed between the plate and elevator in the space the plate is sloped away from the elevator in an upward direction and is yieldably spring biased toward its closed position. One form of the invention is shown in the accompanying drawings.

FIG. 2 is an enlarged scale plan view in the direction of arrow 2 of FIG. 1.

FIG. 3 is a further enlarged scale sectional view on line 3—3 of FIG. 2.

FIG. 4 is a sectional view on line 4—4 of FIG. 3.

FIG. 7 is an enlarged scale fragmentary end view in the direction of arrow 7 of FIG. 1.

FIG. 8 is an enlarged scale sectional view on line 8—8 of FIG. 7.

FIG. 9 is an enlarged scale sectional view on line 9—9 of FIG. 7.

FIG. 10 is an enlarged scale sectional view on line 10—10 of FIG. 1.

FIG. 11 is an enlarged scale fragmentary side elevational view with parts broken away and shown in section to illustrate structural detail.

FIG. 12 is a further enlarged fragmentary view partly in section and partly in elevation of a portion of the structure shown in FIG. 11.

Figure 1:
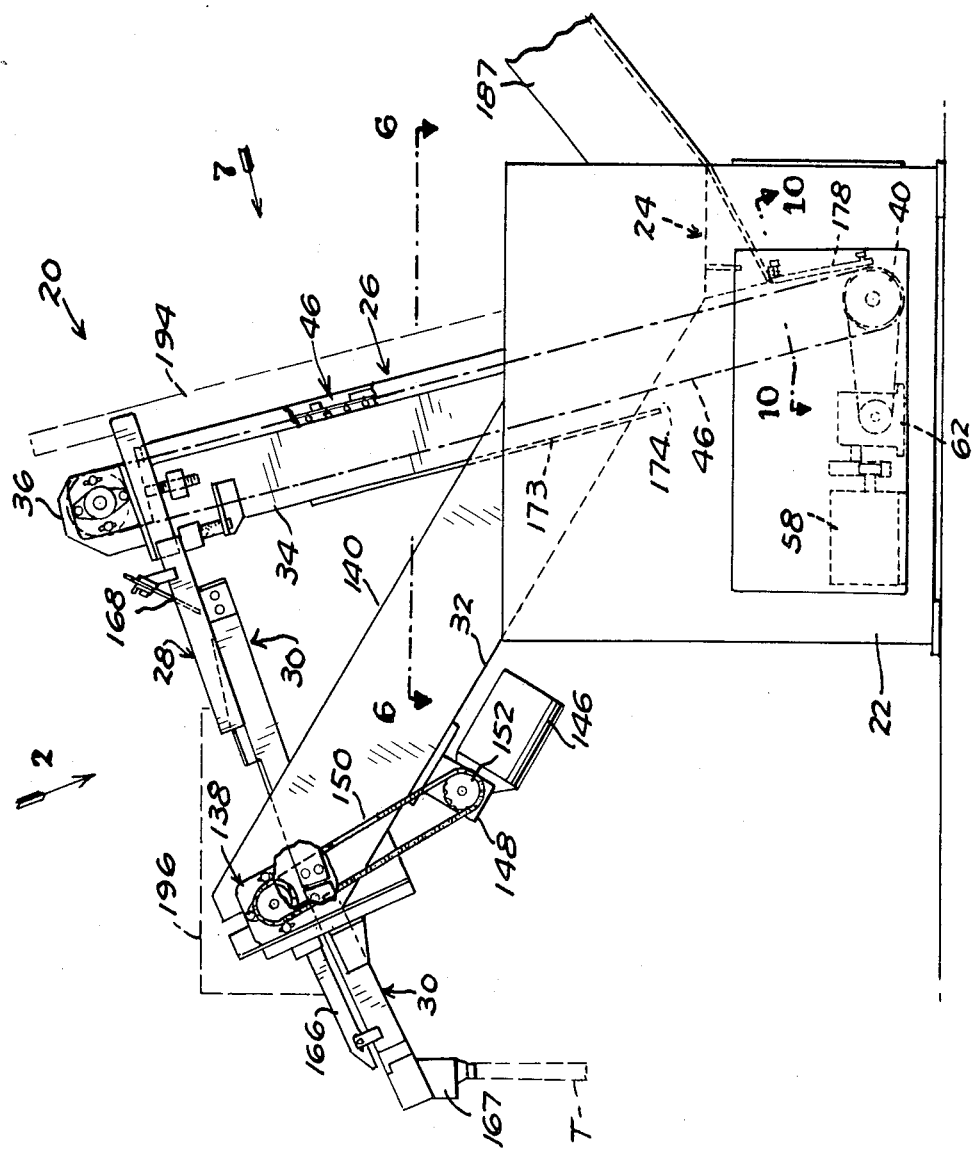
FIG. 1 is a side elevational view of an elevator feeder structure according to the present invention with some parts broken away and other parts shown in phantom to illustrate structural detail.
Figure 5:
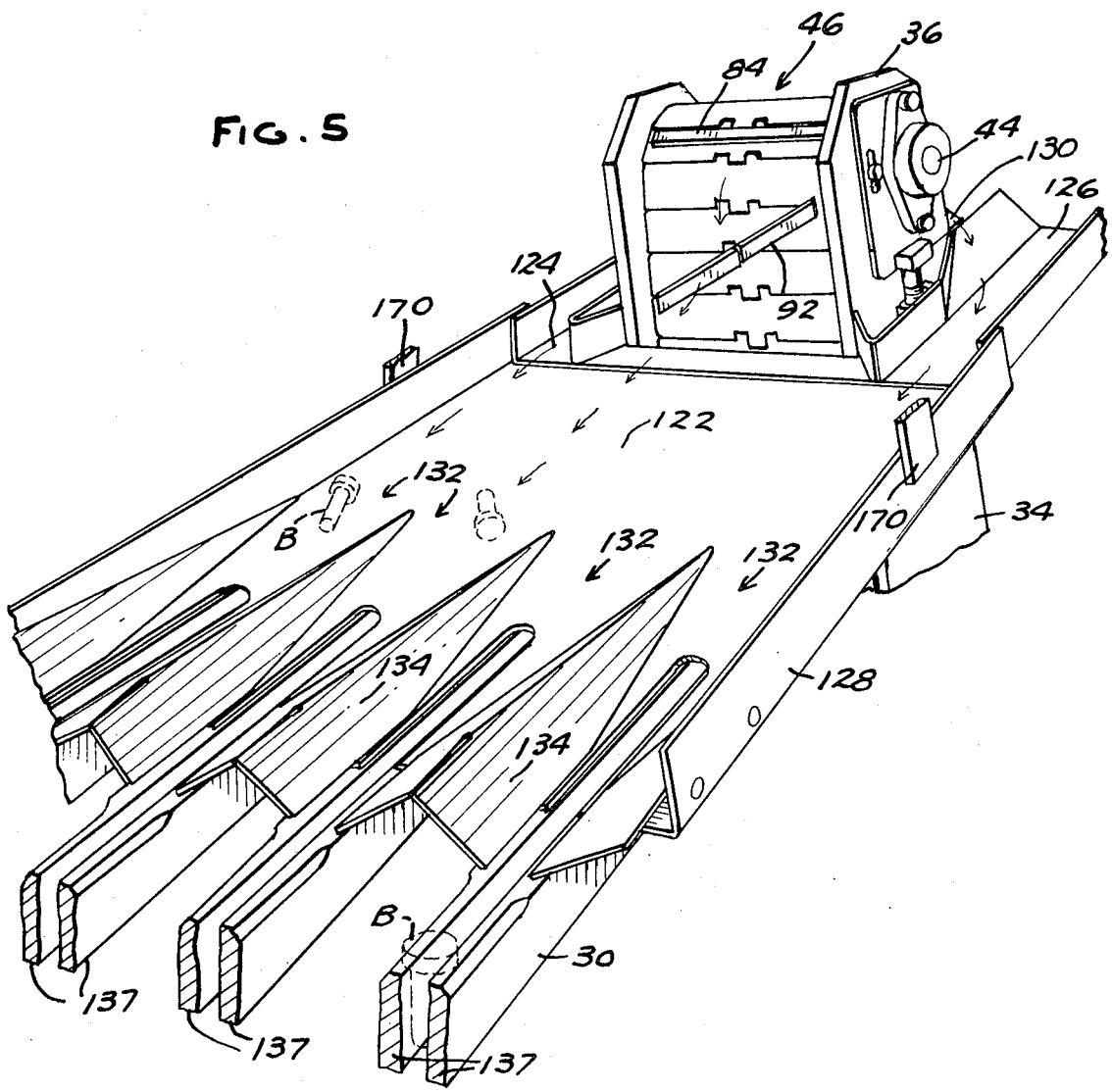
FIG. 5 is a fragmentary perspective view of a portion of the apparatus illustrated in FIG. 2.
Figure 6:
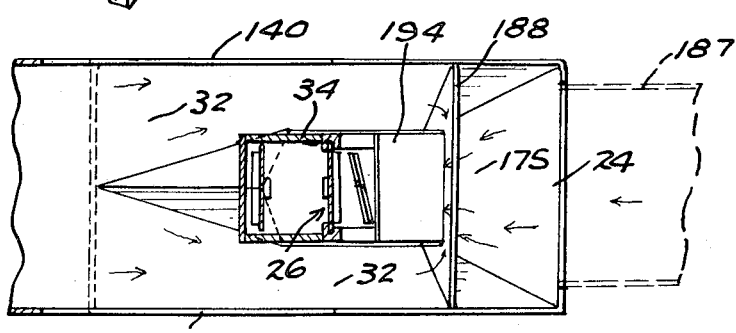
FIG. 6 is a sectional view on line 6—6 of FIG. 1.

Shown in FIG. 1 is an elevator-feeder structure 20 according to the present invention adapted for use with articles such as bolts or screws B having shanks and heads. The structure includes a base 22 supporting a hopper 24 from which articles are carried upwardly by an elevator 26 mounted on base 22. The elevator discharges the articles into a chute 28 which distributes the articles for delivery to a number of laterally spaced feeder tracks 30 which hold the articles single file and in a particular orientation. The articles which fail to become lodged in tracks 30 fall off of the tracks and are returned to hopper 24 by a chute 32.

In the illustrated apparatus elevator 26 is of the endless flexible band type having a frame 34 which is tilted from the vertical and which has an upper end 36 and a lower end 38. (FIGS. 10 and 11). A sprocket 40 is mounted on a shaft 42 journalled adjacent lower end 38 of frame 34 (FIGS. 10 and 11) and a similar sprocket (not shown) is mounted on a shaft 44 journalled adjacent top 36 of frame 34.

A flexible elevator band 46 is entrained around sprockets 40. In the apparatus illustrated, elevator band 46 comprises a series of rigid plates 48 of like construction, each having a lug 50 straddled by lugs 52 on the adjacent plate, interengaged lugs 50 and 52 being pivotally secured together by pins 54 (FIG. 8). The interengaged lugs project beneath plates 48 for engagement within recesses 56 in sprockets 40. Elevator band 46 is driven by a suitable motor such as an electric motor 58 through a drive train which is illustrated as including reduction gearing 60, a reduction gear box 62 which drives a gear 64, and a chain 66 entrained around this gear and another gear 68 which drives lower shaft 42 and the sprocket 40 thereon. A torque limiter 70 is illustrated as being interposed between gear 68 and driven shaft 42.

Elevator band 46 is driven in a circuit upwardly past an open side of hopper 24, above receiving chute 28 and over upper sprocket 40, then downwardly around lower sprocket 40 and upwardly again to hopper 24.

Along each side of elevator band 46 a plate 72, a strip 74 and a rail 76 are secured to frame 34 in superposed relation as by bolting 78 (FIG. 9). Plates 72 are slidably engaged by elevator plates 48 and plates 72 bear that component of the load of the upwardly moving elevator plates which is perpendicular to the general plane of the plates. Strips 74 provide guides for the side edges 80 of plates 48 and also provide spacers between plates 72 and portions 82 of rails 76 which overlap the side portions of plates 48 to insure freedom of movement of the elevator plates. Rails 76 serve to anchor strips 74 and plates 72 in place and overlapping portions 82 retain elevator plates 48 on frame 34. Rails 76 serve an additional retainer function described below.

A plurality of horizontal elevator flights 84 in the form of bars are secured as by welding to selected ones of elevator plates 48. Each flight 84 (FIG. 7) has side edges 86 disposed adjacent inner edges 88 of rails 76 and has a top 90 forming a shelf upon which articles are elevated. Edges 88 are tapered outwardly from plates 48 for a purpose to be described.

A plurality of sloped elevator flights 92 and 94 are secured to elevator band 46. These flights may have identical construction as illustrated except that flights 92 slope downwardly to the right while flights 94 slope downwardly to the left as FIG. 7 is viewed. In the arrangement illustrated in FIG. 7, each flight 92, 94 comprises two separate bars 96 and 98. Each bar 96 has an upper end portion 100 with a side edge 102 disposed adjacent inner edge 88 of a rail 76 and has a lower end 104. Between its upper and lower ends bar 96 has an intermediate portion 106 which is secured to one only of elevator plates 48 as by welding 108. Ends 100, 104 span the juncture between this plate 48 and the elevator plates adjacent thereto as shown in FIG. 7.

Bar 98 has an upper end portion 110 and a lower end portion 112 having a side edge 114 disposed adjacent inner edge 88 of a rail 76. Bar 98 has a portion 116 intermediate its ends 110, 112 secured to one only of elevator plates 48 as by welding 118. This elevator plate is adjacent that to which bar 96 is welded. Upper and lower ends 110, 112 span the junctures between the plate 48 to which bar 98 is welded and the adjacent two plates 48. Lower end 104 of each bar 96 is contiguous to upper end 110 of each bar 98 and the tops of the bars are aligned with each other. Thus the two bars cooperate to form a shelf 120 on flight 92 and a shelf 121 on flight 94 upon which articles are elevated. In the structure illustrated, shelves 120 and 121 are of such a length that they span portions four elevator plates 48.

Usually flights 84, 92, 94 will be positioned close together on elevator band 46. However, preferably successive flights are far enough apart so as not to interfere with the deposit of articles on the flights in any orientation. Thus in the illustrated apparatus the bottom surface of each flight 84 should be spaced above the upper extremity of flight 94 by a distance at least as great as the overall length of bolts B. Similarly, shelf 90 on flight 84 should be spaced by such distance below the lower extremity of flight 92. This permits the bolts to lodge on the flights with the tops of their heads on shelves 90, 120, 121. The maximum spacing between the flights is discussed below.

Chute 28 has a central portion 122 which is disposed downwardly and in front of the top of conveyor band 46 for receiving articles discharged by horizontal flights 84. Chute 28 also has right- and left-hand branches 124, 126 which straddle conveyor 26 and extend rearwardly thereof to positions for receiving articles discharged from sloped flights 92 and 94 respectively. Chute 28 has side rails 128 for containing articles delivered thereto by the elevator.

Right- and left-hand rails 76 terminate at upper edges 129 and 130 positioned respectively above chute branches 124 and 126. These edges slope in generally the same directions as shelves 120 and 121 respectively.

Chute 28 is provided with means which divide it into a plurality of channels 132 which are distributed over the width of the chute so that one channel is provided for each feed track 30. These channels have sloped side walls 134 which converge toward tracks 30 for funneling or channeling articles toward the tracks. In the structure illustrated channels 132 are formed by a number of wedge-shaped plates 134 secured as by welding adjacent the upper surface of chute 28.

Tracks 30 extend downwardly beyond the downstream end of chute 28 and open spaces 136 are left adjacent the tracks. Return chute 32 extends upwardly beneath and beyond spaces 136. Tracks 30 are comprised of a pair of bars 137 spaced apart to receive the shanks of bolts B, the bolt heads being supported by the tops of the bars as shown.

A rotary brush structure 138 is mounted on supports 140 projecting upwardly from base 22. Return chute 32 may also be mounted on these supports as illustrated. The brush structure includes a shaft 142 journalled on a frame 144 and driven by a motor such as an electric motor 146, a reduction gear box and torque limiter 148, and a chain 150 entrained around sprockets 152 and 154 on the gear box and shaft 142 respectively.

A number of disks 156 are keyed to rotate with shaft 142 and between these disks are a number of brush rings 158. The disks and brush rings have complementary annular bearing grooves 159 (FIG. 4) which position the brush rings and enable the brush rings to rotate freely of disks 156. The disks drive the brush rings only by frictional engagement. The brush rings are provided around their circumference with a number of recesses 160 defining shoulders 162 for brushing of flicking articles off of the tops of tracks 30, as is more fully described below.

Downstream of brush structure 138, each track 30 is provided with a sensing device 164 which senses the presence or absence of articles in the track up to the location or level of the sensor. Advantageously, sensors 164 are of the type which emit a jet of air which is interrupted when an article in track 30 is aligned therewith and which remains uninterrupted when no article is aligned therewith. The two conditions result in differential air pressure which is utilized to introduce yes and no signals into the circuitry for elevator motor 58. The circuitry is arranged so that when a yes signal is received from all sensors 164 motor 58 is turned off; when one or more sensors signals no, indicating that the supply of articles in its track is low, motor 58 is turned on.

Downstream of brush structure 138 a retainer bar 166 is mounted above each feed track 30 for containing articles within the track. Mounted on the downstream end of each track 30 is a meter escapement device 167 which on demand transfers articles from track 30 one at a time into a tube T and introduces compresses air into the tube to propel the articles to a delivery point. An example of such a meter escapement device is disclosed in U.S. Pat. No. 3,247,874.

A flexible baffle 168 such as a sheet of rubber is supported above central portion 122 of chute 28 by uprights 170 secured to side rails 128 and a horizontal member 172 supported by uprights 170 and secured to the baffle. The function of this baffle is described below.

The underside or return side of conveyor band 46 is covered by a cover plate 173 only to a location just below return chute 32 and the space below cover plate 173 is open as at 174 to eliminate the possibility of articles becoming jammed between elevator flights 84, 92, 94 and any covering structure.

Hopper 24 has a bottom 175 which slopes downwardly toward elevator band 46 and terminates at a tapered edge 176 which is contiguous to top edge 177 of a cover plate 178 (FIGS. 11 and 12). Edge 176 extends over a portion only of top 177 as shown, for a purpose to be described. Plate 178 has side portions 179 which are secured to the lower end portions of rails 76 by bolts 180 and 181. Plate 178 has a central portion 182 which overlies conveyor band 46 and the elevator flights thereon, this central portion sloping away from the conveyor band in an upward direction (FIG. 12). A coil spring 183 between plate 178 and the head of each bolt 180 biases the plate yieldably toward band 46. The head of each bolt 181 is spaced from plate 178 to facilitate rocking of the plate when the upper end thereof is moved outwardly against the bias of spring 183.

Plate 178 and conveyor band 46 define a pick-up space 184 within which flights 84, 92, and 94 move and into which bolts B may fall from the hopper. A clearance 185 between the flights and plate 178 is less than any cross or length dimension of bolts B so that any bolts which drop over lower edge 176 of the hopper bottom and upper edge 177 of the plate are caught and elevated rather than falling out of the bottom end of the conveyor adjacent the lower end of plate 178. Plate 178 and its mounting perform an anti-jam function described more fully below.

Preferably, the maximum spacing between successive flights 84, 92, 94 is such as to ensure that one complete flight is always within pick-up space 184 before the preceding flight elevates above lower edge 176 of hopper bottom 175 and top edge 177 of plate 178. This ensures that articles dropping into space 184 will be caught and elevated rather than falling out of the bottom of the conveyor as mentioned above.

Hopper 24 has side walls 186 which adjoin bottom 175. A supply chute 187 may be provided for furnishing articles to the hopper. A baffle 188 extends between side walls 186 at a location spaced horizontally from band 46 and the baffle has a lower edge 190 spaced above hopper bottom 175. The hopper bottom and edge 190 thus cooperate to define a restricted feed opening 192 which allows only those articles in hopper 24 disposed below edge 190 to flow downwardly into contact with elevator band 46. The mass of articles above opening 192 is restrained from bearing against the elevator band by baffle 188.

Removable protective screening for parts of the apparatus is represented at 194 and 196 (FIG. 1).

In use, let it be assumed that a supply of articles such as bolts B has been furnished to hopper 24 through chute 187 and that motor 58 is actuated for driving elevator band 46. The mass of bolts which has passed under baffle 88 bear against the elevator band but the mass of bolts above baffle edge 190 is held away from contact with the band. With this arrangement, the upwardly moving elevator flights 84, 92, 94 move only through a mass or column of bolts sufficient to insure deposit of adequate numbers of bolts on the flights. The load on the elevator is thereby minimized.

Depending upon whether or not the mass of bolts adjacent the bottom of the hopper are in tangled or congested condition, some of the bolts will drop into space 184 between plate 178 and the elevator as described. Such bolts may be in numerous orientations and thus may tend to jam between the plate and conveyor particularly if a plurality of bolts fall into space 184 in overlapped or crossed relation.

The outward slope of central portion 182 of plate 178 increases the width of space 184 in an upward direction and tends to relieve the jam as the bolts are carried upwardly. Should this slope provide inadequate relief the entire plate 178 rocks outwardly at its upper end from the solid line position to the dotted line position of FIG. 11 against the bias of springs 183 which renders it almost impossible for the jam to persist. When the jam is broken, springs 183 return the plate to its normal closed position.

The outward rocking or shifting of plate 178 is limited by engagement of lower end portions thereof with the heads of bolts 181. Under this condition, the upper edge 177 of the plate has shifted to the position indicated in dotted lines in FIG. 12 and it is to be noted that the shifting movement stops short of a range in which lower edge 176 of the hopper bottom would project over edge 177. Such a projection would from a lip against which bolts B could catch to form a further jam. Typically, the range of shifting movement of upper edge 177 is about 3/16 inch which is sufficient to eliminate almost every conceivable jamming condition. However, should a jam persist even after plate 78 has shifted outwardly, torque limiter 70 will function to limit the torque transmitted through lower sprocket 40 to the elevator thereby preventing damage to the apparatus. Conveyor motor 58 can be deactuated until the jam is cleared and then reactuated.

As flights 92, 84, and 94 move upwardly through space 184 and hopper 24 at least one and usually a plurality of bolts B become lodged respectively on shelves 120, 90, and 121. The bolts on sloped shelves 120, 121 slide downwardly but are contained against falling off of these flights by inner edges 88 of rails 76. Edges 88 also serve to contain articles on shelves 90.

Occasionally some combination of bolts in different orientations on a horizontal flight 84 form a rigid train across the length of shelf 90 which upon upward movement tends to become wedge or locked against inner edges 88. Were it not for the outward taper of these edges this locking action could become so great as to impede or halt movement of the elevator. However, the portions of the bolts engaged against edges 88 are cammed outwardly thereby immediately breaking the locked train and facilitating umimpeded movement of the elevator.

When a sloped flight 92 is elevated to the position of FIG. 7 the bolts thereon are freed to discharge over upper edge 129 of right-hand rail 76 and into right-hand branch 124 of chute 28. This occurs before flight 92 reaches the top of the conveyor band circuit. In the illustrated arrangement after flight 92 has discharged its load and moved around the top of the elevator circuit a horizontal flight 84 moves upwardly and over the top of the circuit and discharges the bolts B thereon frontally onto chute portion 122. Next, a sloped flight 94 becomes elevated to a height at which its shelf 121 clears left side rail 76 whereupon its load of bolts discharges over upper edge 130 of the rail and into left brance 126 of chute 28.

After each flight has completed its turn around the upper end of the circuit it is carried downwardly around lower sprocket 40 and upwardly again through space 184 and hopper 24 to receive another load of bolts.

When each sloped flight 92, 94 moves around the upper and lower end of its circuit the four plates 48 which it spans pivot relative to each other. Since an intermediate portion only of each component bar 96, 98 is secured to one only of plates 48, ends 100, 104, 110 and 112 of the bars swing freely of the adjacent plates to facilitate such relative pivotal movement of the plates. The bars of each pair swing relatively to each other and pass independently of each other around the upper and lower ends of the circuit. This movement is best illustrated in FIGS. 2 and 11. After the component bars have passed around the end of the circuit they return to aligned relation.

In the arrangement illustrated flights 92, 84, and 94 are disposed in repetitive sequence on elevator band 46 so that bolts B are discharged onto the central portion 122 and side portions 124, 126 of chute 28 alternately. This results in positive distribution of the bolts across the entire width of chute 28 to insure that an adequate supply of bolts is delivered to each channel 132 and its respective track 30. The the sloping, converging side walls of channels 132 funnel bolts B passing therethrough toward single file delivery to their respective tracks 30. Statistically, many of the bolts reach track 30 so oriented that they extend parallel to the tracks. The shanks of such bolts fall between bars 137 and the heads of the bolts are caught and supported by the tops of the bars. These bolts slide downwardly in the tracks toward meter escapements 167.

The bolts which fail to become lodged in tracks 30 either fall off of the tracks of themselves or are intercepted by brush structure 138 and are flicked or brushed off of the tops of the tracks by shoulders 162 in brush rings 158. Such bolts fall through spaces 136 between the tracks onto return chute 32 which returns them to hopper 24. Should a bolt for any reason become jammed with a brush ring 158, the brush ring will merely stop since it is driven by friction only. Damage to the structure is thereby eliminated. Brush structure 138 prevents improperly oriented bolts from passing beyond the upper end of chute 32 where they would drop out of the apparatus.

The bolts which are delivered frontally to the center portion 122 of chute 28 tend to rebound and overshoot channels 132, pass directly through spaces 136 onto chute 32, and return to hopper 24. Baffle 168 catches the rebounding bolts and returns them to the surface of chute 28 to insure their proper entry into channels 132.

Elevator 26 continues to operate in the manner described for so long as the train of bolts in any one track is below the level of its sensor 164. Any excess bolts delivered to a track after it is filled return to hopper 24 through spaces 136 and chute 32. Should all of the tracks be filled to the level of their sensors 164, motor 58 is deactuated as described above to halt the conveyor. Thereafter, when the supply in any one track falls below its sensor level, the motor is reactuated.

Typically, meter escapement devices 167 are capable of feeding 1 X ¼ inch bolts one at a time into tubes T at rates up to 100 per minute; smaller articles up to 150 per minute; and larger articles such as 2 X 5/16 inch bolts at 1 per second or faster. The elevator-feeder structure 20 of this invention feeds an adequate supply of articles into tracks 30 to keep up with the feed rates of meter escapements 167.

In a typical elevator feeder 20, elevator band has an effective width of about 6½ inches between the inner edges 88 of side rails 76. The band is driven at a speed well below that at which articles would discharge improperly into the side branches 124, 126 of chute 128 or central portion 122 thereof.

Figure 13:
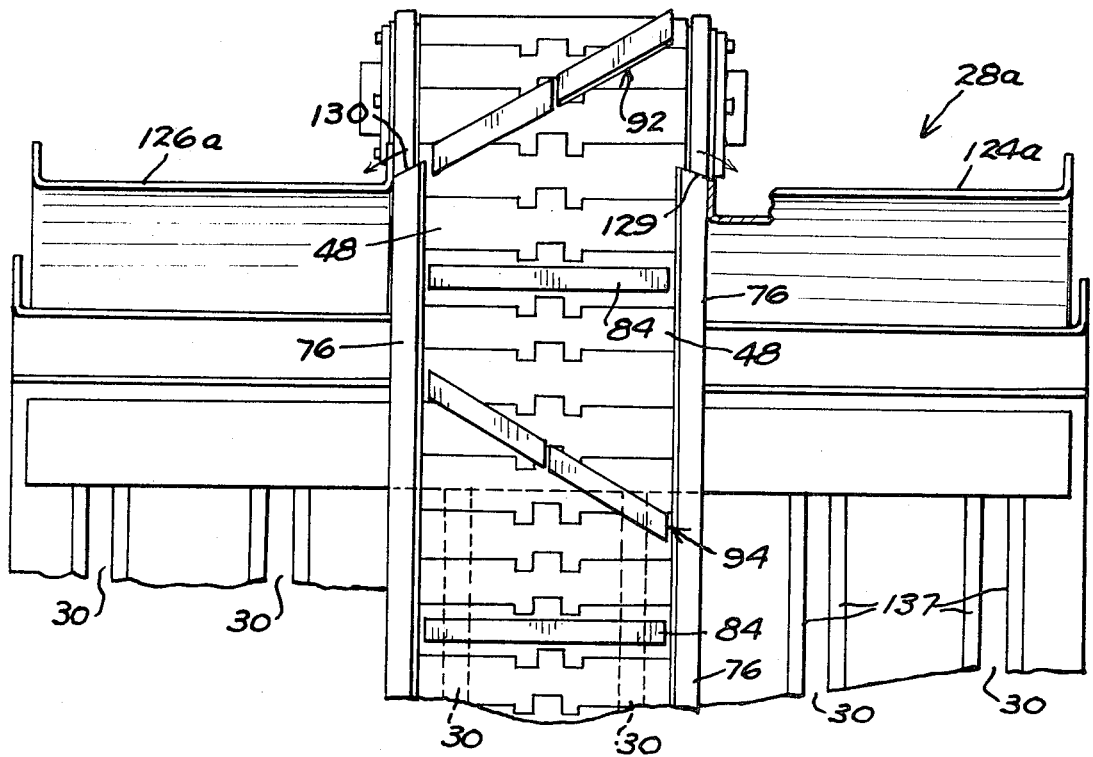
FIG. 13 is a fragmentary view generally similar to FIG. 7 of a structure modified to furnish articles to a greater number of feed tracks.

While the elevator has been illustrated as furnishing articles to only four tracks 30, it is actually capable of furnishing an adequate supply of articles to six tracks as illustrated in FIG. 13. Here chute 28a is modified by extending its side branches 124a and 126a laterally outwardly and dividing the downstream portion of the chute into six channels 132 (not shown).

The various features such as the configuration and mounting of cover plate 178, the taper of inner edges 88 of side rails 76, the provision of baffle 88 in hopper 24, and of flexible baffle 168 above chute 28 and the open, unobstructed downstream return path of conveyor band 46 and its flights all cooperate to insure continuous, reliably trouble free operation of the apparatus.

The elevator-feeder structure of the present invention is thus capable of elevating and feeding articles at a volume and with the reliability required by high speed automated production equipment utilized for example in the automobile manufacturing industry.

Figure 14:
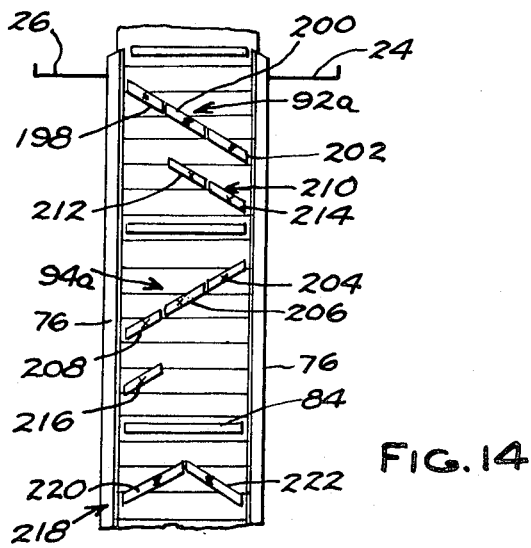
FIG. 14 is a partly diagrammatic view similar to FIG. 7 but on a smaller scale and illustrating different combinations of elevating flights.

The elevator structure illustrated in FIG. 14 is in general similar to that of elevator 26 except that various different arrangements of elevator flights are illustrated. For example flight 92a is shown as comprising three component sloped bars 198, 200, and 202 secured to successive plates 48. Similarly, flight 94a is shown as comprised of three such plates 204, 206, and 208. A partial sloped flight 210 comprised of two sloped bars 212 and 214 is illustrated as well as a partial sloped flight comprised of a single sloped bar 216. Also illustrated is a flight 218 comprised of oppositely sloped bars 220 and 222 which will discharge their respective loads simultaneously into right- and left-hand branches 124, 126 of chute 28.

These flights and flights 92, 94, and 84 could be provided in any desired sequence to obtain various distribution patterns in a receiving chute. Flights 92a, 94a having three or more sloped bars might be used for example where conveyor band 46 is broadened and it is found desirable to shorten the lengths of the sloped bars. Where partial flights are employed, pick-up space 184 should have a length adequate to span successive complete flights for the reason discussed above.

I claims:

1. Elevator-feeder structure which comprises,
  means forming an endless flexible band mounted for circuital movement upwardly past an article receiving location to a delivery location and return to said receiving location,
  means forming an article elevating shelf positioned on said band so that in said upward movement thereof said shelf slopes downwardly toward a side of said band,
  said shelf having a portion between its upper and lower ends secured to said band,
  said ends being free of attachment to said band so that said band can separate therefrom to facilitate flexing of said band.

2. The structure defined in claim 1 and including in addition means effective to retain articles against sliding off of the lower end of said shelf during upward movement thereof, said lower end being free of said retaining means at said delivery location.

3. The structure defined in claim 2 wherein said retaining means comprises a rail extending adjacent the path of upward movement of said lower end and terminating adjacent said delivery location.

4. The structure defined in claim 1 wherein there are a plurality of said shelves on said band, at least certain ones of which slope toward opposite sides of said band, there being a said delivery location adjacent each side of said band.

5. The structure defined in claim 1 wherein said shelf is formed of a plurality of separate but contiguous sloped members, each having upper and lower ends, each member having a portion between its ends secured to a portion of said band with its ends free of attachment to said band to facilitate such flexing.

6. The structure defined in claim 5 wherein said band portions are spaced laterally and longitudinally of each other.

7. The structure defined in claim 1 wherein said band is entrained around an upper sprocket above said delivery location and a lower sprocket below said receiving location.

8. The structure defined in claim 7 and including in addition means forming an article elevating shelf secured on said band so that it extends in a substantially horizontal direction in upward movement thereof, said horizontal shelf being effective to discharge articles thereon over the top of said band adjacent said upper sprocket.

9. The structure defined in claim 8 wherein there are a plurality of said sloped shelves on said band, at least certain ones of which slope toward opposite sides of said band, there being a said delivery location adjacent each side of said band.

10. The structure defined in claim 1 wherein said flexible band comprises a series of plates pivotally secured together, said shelf portion being secured to one only of said plates.

11. The structure defined in claim 5 wherein said flexible band comprises a series of plates pivotally secured together, said portion of each member being secured to one only of said plates.

12. The structure defined in claim 11 wherein said members are secured to adjacent plates.

13. Elevator-feeder structure which comprises a frame having an upper portion and a lower portion upon which sprockets are mounted, said frame being inclined to the vertical between said sprockets,
  a series of plates pivotally secured together and forming an endless flexible band entrained around said sprockets,
  a hopper for containing a supply of articles adjacent said lower portion and a chute adjacent said upper portion for receiving articles elevated from said hopper,
  motor means operable to drive at least one of said sprockets so that said plates move in a circuit upwardly through said hopper, over the top of said upper sprocket, downwardly, around said lower sprocket and upwardly to said hopper,
  a plurality of article elevating shelves secured to certain ones of said plates and extending in a substantially horizontal direction during upward movement thereof,
  said shelves being effective to elevate articles lodged thereon in said hopper and discharge the same over the top of said band onto a central portion of said chute,
  another plurality of article elevating shelves positioned on said band so that certain of them slope downwardly toward one side of said band and certain of them slope downwardly toward the other side of said band,
  each of said sloped shelves having upper and lower ends and having a portion between said ends secured to one only of said plates,
  a rail mounted adjacent each side of said band and extending adjacent the path of movement of said lower ends for retaining on said sloped shelves articles lodged thereon in said hopper to facilitate elevation of such articles by said sloped shelves,
  said rails terminating below said upper sprocket to facilitate discharge of articles from said sloped shelves adjacent the sides of said band, said chute having portions which straddle said frame and extend adjacent the terminals of said rails to receive articles discharged from said sloped shelves.

14. The structure defined in claim 13 wherein said chute has a downstream portion provided with means dividing said chute into a plurality of channels spaced apart along the width of said chute, said channels having side walls which converge in a downstream direction to funnel articles passing therethrough toward single-file relation.

15. The structure defined in claim 14 wherein a track is mounted adjacent the downstream end portion of each channel, each track being adapted to receive articles from said channel and hold the same in single file.

16. The structure defined in claim 15 wherein said tracks are constructed and arranged so that said articles become lodged therein only when oriented in a predetermined manner, and a return chute extending from below said tracks to said hopper for returning to said hopper improperly oriented articles which fall off of said tracks.

17. The structure defined in claim 16 and including rotary brush means for brushing such improperly oriented articles off of said tracks.

18. The structure defined in claim 15 wherein each track is provided with a detector operable to signal the presence and absence of a predetermined level of supply of articles in said track, and circuitry operable to deactivate and activate said motor means responsive respectively to receipt of said presence signals from all of said detectors, and an absence signal from one or more of said detectors.

19. The structure defined in claim 18 wherein each of said detectors includes means for blowing a jet of air which is interrupted or uninterrupted, depending on the presence or absence of an article at said level in said track.

20. The structure defined in claim 13 wherein said hopper has a bottom which slopes downwardly toward said band, said hopper having means forming a baffle which extends in a generally vertical direction and which is horizontally spaced from said band, said baffle having a lower edge portion which cooperates with said bottom to form a restricted feed opening for limiting the mass of articles which can bear against said band.

21. The structure defined in claim 13 wherein a cover plate is provided over a lower portion of said band extending from said lower sprocket to the bottom of said hopper, said cover plate being spring biased to closed condition whereby to yield to the force of articles jammed between said lower band portion and cover plate.

22. The structure defined in claim 21 wherein said cover plate is secured on said frame by a plurality of bolts, compressed coil springs being interposed between the outer face of said cover plate and the ends of at least certain of said bolts.

23. The structure defined in claim 13 wherein said cover plate slopes away from said band in an upward direction.

24. The structure defined in claim 21 wherein said cover plate slopes away from said band in an upward direction.

25. The structure defined in claim 15 wherein a meter escapement device is mounted adjacent the downstream end of each track, each said device being operable to feed articles from said track one by one through an outlet.

26. Elevator-feeder structure which comprises a frame having an upper portion and a lower portion,
a hopper for containing a supply of articles adjacent said lower portion and a chute adjacent said upper portion for receiving articles elevated from said hopper,
a motor-driven elevator operable to elevate articles from said hopper and to discharge said articles onto said chute, both frontally and laterally of said frame for distributing the articles over the width of said chute,
said chute having a downstream portion provided with means dividing said chute into a plurality of channels spaced apart along the width of said chute,
said channels having side walls which converge in a downstream direction to funnel articles passing therethrough toward single file relation,
means forming a track mounted adjacent the downstream end portion of each channel and being adapted to receive articles from said channel and hold the same in single file,
each track being constructed and arranged so that said articles become lodged therein only when oriented in a predetermined manner and improperly oriented articles fall therefrom,
and a return chute extending from below said tracks to said hopper for returning to said hopper improperly oriented articles which fall off of said tracks.

27. The structure defined in claim 26 wherein said hopper has a bottom which slopes downwardly toward said elevator,
said hopper having means forming a baffle which extends in a generally vertical direction and which is horizontally spaced from said elevator,
said baffle having a lower edge portion which cooperates with said bottom to form a restricted feed opening for limiting the mass of articles which can bear against said elevator.

28. Elevator-feeder structure which comprises,
elevating means mounted for movement from an article-receiving location toward two elevated delivery locations,
means forming two article-elevating shelves secured for movement with said elevating means, one substantially horizontal and the other sloped,
retaining means effective to retain articles against sliding off of the lower end of said sloped shelf,
said lower end being free of said retaining means at one of said delivery locations so that articles discharge from said sloped shelf in one direction,
means effective to cause articles on said horizontal shelf to discharge therefrom in another direction responsive to elevation of said horizontal shelf to the other of said delivery locations,
and drive means operable to move said elevating means repetitively from said receiving location toward said delivery locations.

29. The structure defined in claim 27 wherein said other delivery location is above said one delivery location.

30. The structure defined in claim 29 wherein said lower end becomes elevated to said one delivery location prior to elevation of said horizontal shelf to said other delivery location.

31. The structure defined in claim 28 and including in addition means forming a chute having portions positioned respectively to receive articles from said delivery locations so that articles received by said chute are distributed with respect to the width thereof.

32. The structure defined in claim 31 wherein said chute downstream of said portions is provided with means dividing said chute into a plurality of channels spaced apart along the width of said chute into which the received articles pass.

33. The structure defined in claim 28 and including in addition means forming a third article elevating shelf secured for movement with said elevating means and being sloped in a direction opposite to that of the first said sloped shelf, a said retaining means for the lower end of said third shelf, and a third delivery location at which the lower end of said third shelf is free of its corresponding retaining means.

34. The combination defined in claim 33 wherein said other delivery location is above said one and third delivery locations, said one and third delivery locations being at generally like elevations.

35. The structure defined in claim 34 and including in addition means forming a chute having portions positioned respectively to receive articles from said delivery locations so that articles received by said chute and distributed with respect to the width thereof.

36. The structure defined in claim 35 wherein said chute downstream of said portions is provided with means dividing said chute into a plurality of channels spaced apart along the width of said chute into which the received articles pass.

37. The structure defined in claim 32 wherein each of said channels has side walls which converge in a downstream direction, and means forming a track positioned adjacent the downstream end of each channel and adapted to hold in single file articles received from the channel.

38. The structure defined in claim 36 wherein each of said channels has side walls which converge in a downstream direction, and means forming a track positioned adjacent the downstream end of each channel and adapted to hold in single file articles received from the channel.

39. In combination with the structure defined in claim 28 means forming a hopper for containing articles, said hopper having an open side portion adjacent said receiving location for supplying articles to said shelves.

40. The combination defined in claim 39 wherein said hopper has a bottom which slopes downwardly toward said receiving location, and means forming a baffle which extends in a generally vertical direction in said hopper, said baffle having a lower edge portion which cooperates with said bottom to form a restricted feed opening for limiting the mass of articles which can bear against said elevating means.

41. The structure defined in claim 28 wherein said one delivery location is below said other delivery location and said lower end becomes elevated to said one delivery location prior to elevation of said horizontal shelf to said other delivery location,
means forming a chute having portions positioned respectively to receive articles from said delivery locations so that the received articles are distributed with respect to the width thereof,
means downstream of said portion dividing said chute into a plurality of channels spaced apart along the width of said chute,
each of said channels having side walls which converge in a downstream direction to funnel articles therein toward single file relation,
and means forming a track positioned adjacent the downstream end of each channel and being adapted to hold in single file articles received from the channel.

42. The structure defined in claim 41 and including in addition a hopper adjacent said receiving location for supplying articles to said shelves,
said hopper having a bottom which slopes downwardly toward said receiving location,
means forming a baffle which extends in a generally vertical direction in said hopper and which is horizontally displaced from said receiving location,
said baffle having a lower edge portion which cooperates with said bottom to form a restricted feed opening for limiting the mass of articles which can bear against said elevating means.

43. The structure defined in claim 42 wherein said tracks are constructed and arranged so that said articles become lodged therein only when oriented in a predetermined manner and improperly oriented articles fall therefrom,
and a return chute extending from below said tracks to said hopper for returning to said hopper improperly oriented articles which fall off of said tracks.

44. Elevator-feeder structure which comprises a frame and elevating means mounted thereon,
article elevating shelf means, said elevating means being operable to move said shelf means from an article receiving location to an elevated article delivery location,
means forming a rail extending adjacent the path of movement of each end portion of said shelf means,
each rail having an inner edge portion which faces said shelf means and which is positioned to contain articles thereon,
said edge portions being tapered outwardly and defining cams effective to prevent articles on said shelf means from becoming locked thereagainst during upward movement thereof.

45. The structure defined in claim 44 wherein said shelf means includes a substantially horizontal article elevating shelf.

46. The structure defined in claim 45 wherein said shelf means includes an article elevating shelf which is sloped downwardly toward a said rail,
said inner edge portion of said rail being effective to contain articles against sliding off of said sloped shelf.

47. The structure defined in claim 46 wherein said elevating means comprises means forming a flexible endless circuital band to which said shelves are secured.

48. The structure defined in claim 44 wherein said elevating means comprises means forming a flexible endless circuital band.

49. Elevator-feeder structure which comprises elevating means having shelf means thereon mounted for movement from a lower location upwardly to an elevated article delivery location, means forming a hopper having a bottom wall with a lower edge spaced adjacent to but out of the path of upward movement of said shelf means, means forming a cover plate which cooperates with said elevating means to define a space below said lower edge into which articles may fall from said hopper, said cover plate being spaced from said shelf means to provide a clearance less than cross and length dimensions of articles with which said structure is adapted to be used so that said shelf means closes the bottom of said space to exit of such articles, said cover plate having a central portion which is sloped to increase the distance between said cover plate and elevating means in an upward direction whereby to relieve jamming of articles which may occur in said space.

50. The structure defined in claim 49 wherein said plate has an upper edge which is contiguous to said lower edge of said hopper bottom, said upper edge projecting beyond said lower edge toward said path of movement to prevent jamming of articles against said lower edge.

51. The structure defined in claim 50 wherein said plate is mounted so that its upper portions can shift away from said elevating means, said upper portions being spring biased toward said elevating means so that it can yieldably shift away from said elevating means for relief of articles jamming in said space.

52. The structure defined in claim 51 and including in addition means effective to limit the range of shifting movement of said upper plate portions to a distance no greater than that by which said upper edge portion projects beyond said lower edge of said hopper bottom.

53. The structure defined in claim 52 wherein said plate is secured adjacent said elevating means by upper and lower bolts, said spring bias being provided by springs interposed between said plate and the heads of said upper bolts, said lower bolts having heads spaced from lower portions of said plate, said lower plate portions and lower bolt heads being interengageable to so limit said range of shifting movement.

54. The structure defined in claim 53 wherein said elevating means comprises means forming a flexible endless circuital band and said shelf means comprises means forming a plurality of article elevating shelves spaced apart along the length of the band circuit, the spacing between said shelves being no greater than the distance between the lower end of said plate and said upper edge thereof, whereby to maintain said space closed to escape of articles through the bottom thereof.

55. The structure defined in claim 49 wherein said elevating means comprises means forming a flexible endless circuital band and said shelf means comprises means forming a plurality of articles elevating shelves spaced apart along the length of the band circuit, the spacing between said shelves being no greater than the distance between the lower end of said plate and said upper edge thereof, whereby to maintain said space closed to escape of articles through the bottom thereof.

* * * * *